(12) United States Patent
Cohen et al.

(10) Patent No.: US 9,261,238 B2
(45) Date of Patent: Feb. 16, 2016

(54) METHOD FOR DISPENSING A GAS

(71) Applicant: Air Products and Chemicals, Inc., Allentown, PA (US)

(72) Inventors: Joseph Perry Cohen, Bethlehem, PA (US); David John Farese, Riegelsville, PA (US); Nicholas Francis Mittica, Zionsville, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 242 days.

(21) Appl. No.: 13/648,622

(22) Filed: Oct. 10, 2012

(65) Prior Publication Data

US 2014/0007975 A1  Jan. 9, 2014

Related U.S. Application Data

(63) Continuation-in-part of application No. 13/542,761, filed on Jul. 6, 2012, now abandoned.

(51) Int. Cl.
*B65B 3/04* (2006.01)
*F17C 5/06* (2006.01)

(52) U.S. Cl.
CPC .............. *F17C 5/06* (2013.01); *F17C 2221/012* (2013.01); *F17C 2221/033* (2013.01); *F17C 2223/0115* (2013.01); *F17C 2223/0123* (2013.01); *F17C 2223/035* (2013.01); *F17C 2223/036* (2013.01); *F17C 2225/0115* (2013.01); *F17C 2225/0123* (2013.01); *F17C 2225/035* (2013.01); *F17C 2225/036* (2013.01); *F17C 2227/039* (2013.01); *F17C 2227/0323* (2013.01); *F17C 2227/0355* (2013.01); *F17C 2227/0388* (2013.01); *F17C 2227/047* (2013.01); *F17C 2250/0439* (2013.01); *F17C 2250/0443* (2013.01); *F17C 2260/023* (2013.01); *F17C 2265/065* (2013.01); *F17C 2270/0168* (2013.01); *F17C 2270/0171* (2013.01); *F17C 2270/0176* (2013.01); *F17C 2270/0178* (2013.01); *Y02E 60/321* (2013.01)

(58) Field of Classification Search
CPC ......................................................... B65B 3/04
USPC ............... 141/47, 48, 62, 69, 70, 82; 165/65; 62/48.1, 117, 120, 198
See application file for complete search history.

(56) References Cited

U.S. PATENT DOCUMENTS 1,339,431 A * 5/1920 Backhaus ........................ 141/4
5,409,046 A * 4/1995 Swenson et al. ................ 141/11
5,540,059 A * 7/1996 Yokokawa ...................... 62/48.2

(Continued)

FOREIGN PATENT DOCUMENTS

EP  1 593 905 A2  11/2005
FR  2 928 716 A1  9/2009

(Continued)

OTHER PUBLICATIONS

Boyd, Robert, "Linde Hydrogen Vehicle Fueling Systems", Hydrogen Solutions, North America, The Linde Group, Aug. 15, 2008, pp. 1-28.

*Primary Examiner* — Jason K Niesz
*Assistant Examiner* — Andrew Schmid
(74) *Attorney, Agent, or Firm* — Bryan C. Hoke, Jr.

(57) ABSTRACT

A method for dispensing gas within a target temperature range wherein the gas exchanges heat with multiple thermal capacitors to cool the gas.

14 Claims, 1 Drawing Sheet

(56) References Cited

U.S. PATENT DOCUMENTS

| | | | |
|---|---|---|---|
| 6,360,793 B1* | 3/2002 | Sugano et al. | 141/197 |
| 6,427,483 B1 | 8/2002 | Rashad et al. | |
| 6,619,336 B2* | 9/2003 | Cohen et al. | 141/83 |
| 2002/0129867 A1* | 9/2002 | Krasnov | 141/11 |
| 2003/0150510 A1 | 8/2003 | Cohen et al. | |
| 2003/0182947 A1 | 10/2003 | Kimble et al. | |
| 2004/0182470 A1* | 9/2004 | White | 141/11 |
| 2007/0079892 A1* | 4/2007 | Cohen et al. | 141/105 |
| 2007/0125441 A1* | 6/2007 | Farese et al. | 141/2 |
| 2008/0209916 A1* | 9/2008 | White | 62/48.1 |
| 2009/0236006 A1* | 9/2009 | Farese et al. | 141/3 |
| 2012/0104036 A1* | 5/2012 | Farese et al. | 222/1 |
| 2012/0125480 A1 | 5/2012 | Inagi et al. | |
| 2013/0056111 A1* | 3/2013 | White | 141/5 |
| 2014/0007975 A1* | 1/2014 | Cohen et al. | 141/11 |

FOREIGN PATENT DOCUMENTS

| | | |
|---|---|---|
| JP | 2008196590 | 8/2008 |
| WO | 2005068847 A1 | 7/2005 |
| WO | 2011049466 A1 | 4/2011 |

* cited by examiner

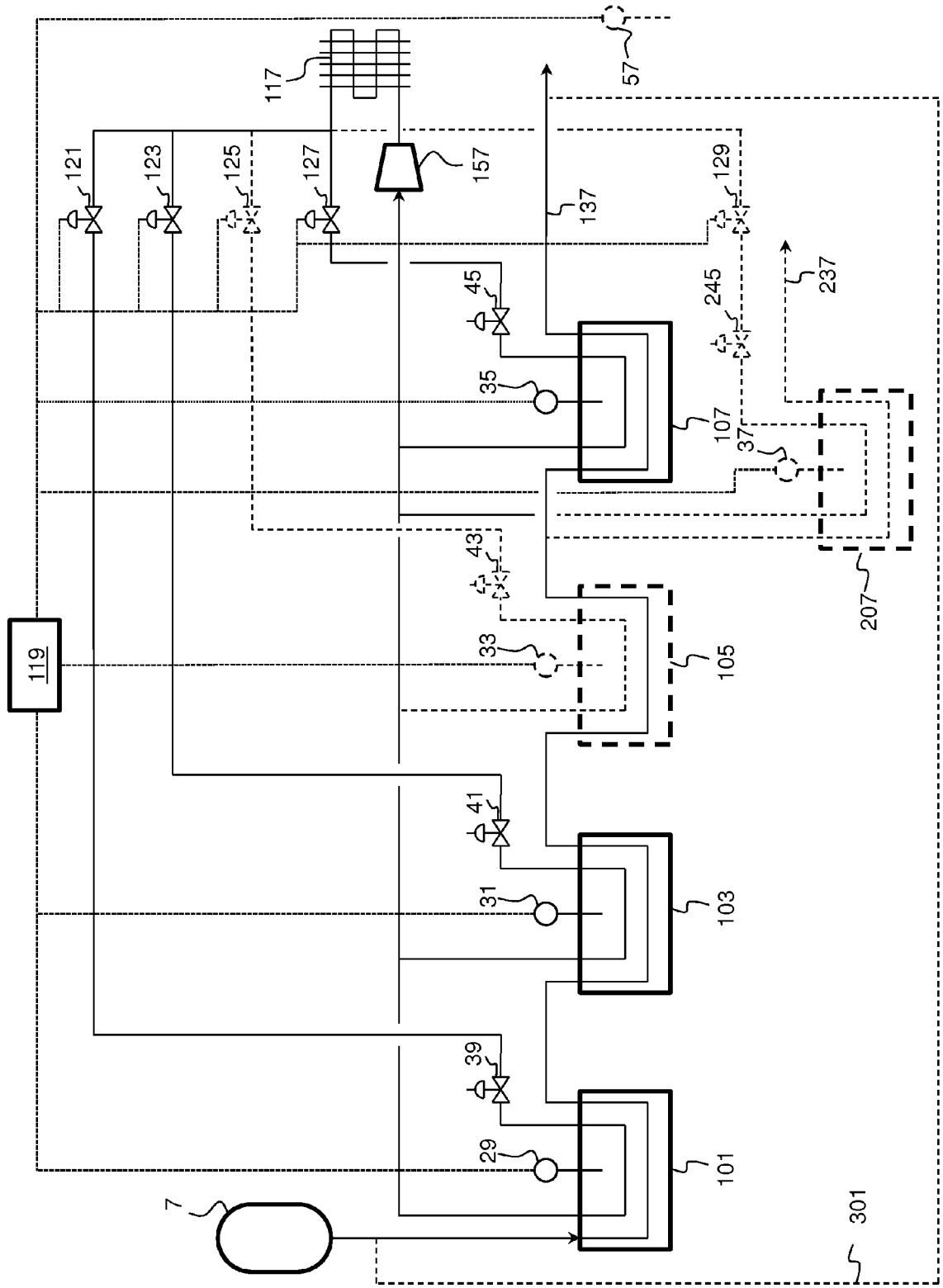

METHOD FOR DISPENSING A GAS

CROSS-REFERENCE TO RELATED APPLICATIONS

This application is a continuation-in-part of U.S. application Ser. No. 13/542,761, filed Jul. 6, 2012, the specification and claims which are incorporated by reference and made a part of this application.

BACKGROUND

The present invention is particularly suited for dispensing hydrogen to vehicles that use hydrogen as a fuel.

Industry desires to dispense hydrogen gas that has been cooled from ambient temperature down to a temperature within a narrow temperature range during the dispensing event. The refrigeration load during the dispensing event is much larger than the average refrigeration requirement.

In an example dispensing protocol, there is a need to provide hydrogen gas at a temperature between −33° C. and −40° C. The hydrogen gas must be dispensed within this target temperature range for multiple sequential dispensing events. The dispensing station and method must therefore be capable of providing sufficient cooling for each of the multiple sequential dispensing events within the target temperature range for quantities of gas that will vary both in size, typically 3 to 10 kg, and in flow rate, typically 0.25 to 3.6 kg/min.

BRIEF SUMMARY

The present invention relates to a method for dispensing a gas.

There are several aspects of the method as outlined below.

Aspect 1. A method comprising:
  withdrawing a first quantity of the gas from a gas source;
  cooling the first quantity of gas via heat exchange with a first thermal capacitor wherein the first thermal capacitor has a temperature lower than the minimum temperature of a first target temperature range when the first quantity of gas is initially cooled by the first thermal capacitor;
  cooling the first quantity of gas via heat exchange with a second thermal capacitor wherein the second thermal capacitor has a temperature lower than the minimum temperature of the first target temperature range when the first quantity of gas is initially cooled by the second thermal capacitor, wherein the first quantity of gas is cooled via heat exchange with the second thermal capacitor after being cooled via heat exchange with the first thermal capacitor;
  heating or cooling the first quantity of gas via heat exchange with a third thermal capacitor wherein the third thermal capacitor has a temperature within the first target temperature range, wherein the first quantity of gas exchanges heat with the third thermal capacitor after being cooled via heat exchange with the second thermal capacitor; and
  introducing the first quantity of gas from the third thermal capacitor into a first receiving vessel, the first quantity of gas thereby having a dispensing temperature within the first target temperature range.

Aspect 2. The method of aspect 1 wherein the first quantity of gas is heated via heat exchange with the third thermal capacitor.

Aspect 3. The method of aspect 1 or aspect 2 further comprising:
  withdrawing a second quantity of the gas from the gas source;
  cooling the second quantity of gas via heat exchange with the first thermal capacitor;
  cooling the second quantity of gas via heat exchange with the second thermal capacitor, wherein the second quantity of gas is cooled via heat exchange with the second thermal capacitor after being cooled via heat exchange with the first thermal capacitor;
  heating or cooling the second quantity of gas via heat exchange with the third thermal capacitor wherein the third thermal capacitor has a temperature within the first target temperature range, wherein the second quantity of gas exchanges heat with the third thermal capacitor after being cooled via heat exchange with the second thermal capacitor; and
  introducing the second quantity of gas from the third thermal capacitor into a second receiving vessel, the second quantity of gas thereby having a dispensing temperature within the first target temperature range.

Aspect 4. The method of any one of aspects 1 to 3 further comprising:
  cooling the first thermal capacitor, the second thermal capacitor, and the third thermal capacitor via heat exchange with a refrigerant, wherein the refrigerant is cycled in a refrigeration cycle.

Aspect 5. The method of aspect 4 wherein the flow rate of the refrigerant to each of the first thermal capacitor, the second thermal capacitor, and the third thermal capacitor is independently controlled.

Aspect 6. The method of any one of aspects 1 to 3 further comprising:
  cooling the first thermal capacitor and the second thermal capacitor via heat exchange with a refrigerant, wherein the refrigerant is cycled in a refrigeration cycle; and
  cooling the third thermal capacitor via heat exchange with a second refrigerant, wherein the second refrigerant is cycled in a second refrigeration cycle.

Aspect 7. The method of any one of aspects 4 to 6 wherein the refrigerant is selected from the group consisting of R22, R404A, and R507.

Aspect 8. The method of aspect 6 wherein the second refrigerant is selected from the group consisting of R22, R404A, and R507.

Aspect 9. The method of any one of aspects 1 to 8 further comprising:
  withdrawing a third quantity of the gas from the gas source;
  cooling the third quantity of gas via heat exchange with the first thermal capacitor;
  cooling the third quantity of gas via heat exchange with the second thermal capacitor, wherein the third quantity of gas is cooled via heat exchange with the second thermal capacitor after being cooled via heat exchange with the first thermal capacitor;
  heating or cooling the third quantity of gas via heat exchange with a fourth thermal capacitor wherein the fourth thermal capacitor has a temperature within a second target temperature range, wherein the second target temperature range is different than the first target temperature range, and wherein the third quantity of gas exchanges heat with the fourth thermal capacitor after being cooled via heat exchange with the second thermal capacitor; and
  introducing the third quantity of gas from the fourth thermal capacitor into a third receiving vessel, the third quantity of gas thereby having a dispensing temperature within the second target temperature range.

Aspect 10. The method of aspect 9 further comprising:
measuring an ambient temperature representative of conditions surrounding a fourth receiving vessel;
withdrawing a fourth quantity of the gas from the gas source;
cooling the fourth quantity of gas via heat exchange with the first thermal capacitor;
cooling the fourth quantity of gas via heat exchange with the second thermal capacitor, wherein the fourth quantity of gas is cooled via heat exchange with the second thermal capacitor after being cooled via heat exchange with the first thermal capacitor;
heating or cooling the fourth quantity of gas via heat exchange with one of the third thermal capacitor and the fourth thermal capacitor, the third thermal capacitor having its temperature within the first temperature range, the fourth thermal capacitor having its temperature within the second temperature range, the selection of heating or cooling the fourth quantity of gas via heat exchange with the third thermal capacitor or the fourth thermal capacitor dependent upon the measured ambient temperature surrounding the fourth receiving vessel; and
introducing the fourth quantity of gas from the third thermal capacitor or from the fourth thermal capacitor into the fourth receiving vessel, the fourth quantity of gas thereby having a dispensing temperature within the first target temperature range when the fourth quantity of gas exchanges heat with the third thermal capacitor or having a dispensing temperature within the second target temperature range when the fourth quantity of gas exchanges heat with the fourth thermal capacitor.

Aspect 11. The method of any one of aspects 1 to 10 wherein at least one of the first thermal capacitor, the second thermal capacitor, and the third thermal capacitor comprises a metal.

Aspect 12. The method of aspect 11 wherein the metal is aluminum.

Aspect 13. The method of any one of aspects 1 to 9 wherein at least one of the first thermal capacitor, the second thermal capacitor, and the third thermal capacitor comprises a liquid.

Aspect 14. The method of aspect 13 wherein the liquid is a liquid hydrocarbon.

Aspect 15. The method of aspect 14 wherein the liquid hydrocarbon is a C10-C13 iso-alkane.

Aspect 16. The method of any one of aspects 1 to 15 further comprising:
withdrawing a fifth quantity of the gas from the gas source; and
introducing the fifth quantity of gas from the gas source into a fifth receiving vessel without cooling the fifth quantity of gas between withdrawing the fifth quantity of gas from the gas source and introducing the fifth quantity of gas into the fifth receiving vessel.

Aspect 17. The method of any one of the preceding aspects further comprising:
measuring an ambient temperature representative of conditions surrounding the first receiving vessel prior to withdrawing the first quantity of gas from the gas source; and
setting the first target temperature range dependent upon the measured ambient temperature prior to withdrawing the first quantity of gas from the gas source.

BRIEF DESCRIPTION OF SEVERAL VIEWS OF THE DRAWINGS

The sole FIGURE is a schematic of a system suitable for carrying out the method.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

As used herein, "first," "second," "third," etc. are used to distinguish from among a plurality of steps and/or features, and is not indicative of the relative position in time and/or space.

Compressed natural gas (CNG) and hydrogen are the typical components dispensed from storage systems, which are usually installed outdoors and are therefore subjected to wide ranges of ambient temperatures. Ambient temperatures are well above the critical temperature of hydrogen (−240° C. (−400° F.)) and methane (−83° C. (−117° F.)), so that these components typically are stored and dispensed as supercritical fluids rather than gases according to strict thermodynamic definitions. However, the terms "gas" and "compressed gas" are usually used in the art as generic terms for both gases and supercritical fluids. In the present disclosure, the terms "gas" and "compressed gas" may be used interchangeably and are meant to include elements and compounds in both thermodynamic states of gas and supercritical fluid. The generic term "fluid" as used herein includes both thermodynamic states of gas and supercritical fluid.

A gas dispensing system is defined as a pressurized gas storage and supply system for providing pressurized gas to a portable receiving tank or vessel. The gas dispensing system includes a connector to couple with the receiving vessel for gas transfer and an appropriate safety interlock system to ensure safe operation during the filling step. The receiving tank or vessel typically is part of a vehicle such as a car, truck, bus, or forklift.

The present invention relates to a method for dispensing a gas, for example $H_2$, at a temperature within one or more target temperature ranges. Target temperature ranges may be preset by the device or selected by a user or operator. The target temperature ranges may be dependent on a measured ambient temperature. The target temperature ranges may be dependent on a measured temperature of the receiving vessel and/or gas in the receiving vessel. Each target temperature range has its prescribed minimum temperature and maximum temperature.

The method will be described with reference to the FIGURE illustrating a suitable apparatus for carrying out the method.

The apparatus comprises a gas source 7, at least three thermal capacitors 101, 103, and 107, a compressor 157, a heat exchanger (condenser) 117, a controller 119, temperature measurement devices 29, 31, and 35, and various conduits and valves. The apparatus may comprise one or more optional thermal capacitors 105 and 207 with corresponding temperature measurement devices 33 and 37.

The method comprises withdrawing a first quantity of gas from gas source 7. The gas source may be one or more tanks or vessels, a pipeline, or any other known source for the gas. The first quantity of gas may be an amount sufficient to refill a vehicle fuel tank, for example 3 kg to 10 kg.

The first quantity of gas is cooled via heat exchange with first thermal capacitor 101. Upon initial cooling of the first quantity of gas, the first thermal capacitor 101 has a temperature that is lower than the minimum temperature of a first target temperature range. For example, if the first target temperature range is −33° C. to −40° C., the temperature of the first thermal capacitor 101 is less than −40° C. The temperature of the first thermal capacitor 101 may be as cold as −60° C.

As used herein, a thermal capacitor is any thermal storage element capable of releasing heat to a refrigerant and/or the gas, and absorbing heat from the refrigerant and/or the gas. A thermal capacitor may have a thermal mass greater than 40 kJ/K. The thermal mass is the mass of an object multiplied by the specific heat capacity of the object. A thermal capacitor may comprise a metal. The metal may be aluminum. A thermal capacitor may comprise a liquid. The liquid may be a liquid hydrocarbon. The liquid hydrocarbon may be a C10 to C13 iso-alkane, for example Therminol® D12 heat transfer fluid. A thermal capacitor may comprise a phase change material. The phase change material may be a eutectic comprising Sb, Te, and Ge (cf. *Phase Change Materials, Science and Applications*, Simone Raoux and Matthias Wuttig, Editors, Springer Science+Business Media, New York, 2009.

Thermal capacitors are preferably insulated to prevent heating of the thermal capacitors by the surrounding ambient air.

After being cooled via heat exchange with the first thermal capacitor, the first quantity of gas is cooled via heat exchange with second thermal capacitor 103. Upon initial cooling of the first quantity of gas, the second thermal capacitor 103 has a temperature that is lower than the minimum temperature of the first target temperature range.

After being cooled via heat exchange with the second thermal capacitor, the first quantity of gas may be heated or cooled via heat exchange with a third thermal capacitor 107. The third thermal capacitor has a temperature within the first target temperature range. If the temperature of the first quantity of gas is less than the minimum temperature of the first target temperature range after exchanging heat with previous thermal capacitors, the third thermal capacitor 107 will heat the first quantity of gas to a temperature within the first target temperature range. If the temperature of the first quantity of gas is greater than the maximum temperature of the first target temperature range after exchanging heat with previous thermal capacitors, the third thermal capacitor 107 will cool the first quantity of gas to a temperature within the first target temperature range.

After the temperature of the first quantity of gas has been brought within first target temperature range via heat exchange with the third thermal capacitor, the first quantity of gas, having a dispensing temperature within the first target temperature range, is introduced into a first receiving vessel (not shown) via conduit 137 and a dispensing connector (not shown). The first receiving vessel may be part of a vehicle such as a car, truck, bus, or forklift. The dispensing connector may be any suitable dispensing connector for dispensing the gas to a receiving vessel. Dispensing connectors are known in the art.

The gas flow rate may be controlled to provide a specified mass flow rate or a pressure ramp rate.

As shown in the FIGURE, the first quantity of gas may be cooled by additional thermal capacitors 105 between cooling in the second thermal capacitor 103 and heating or cooling in the third thermal capacitor 107.

The thermal masses of the thermal capacitors may be the same or different. The first thermal capacitors in the series may each have the same thermal mass while the final thermal capacitor has a different thermal mass. The first thermal capacitor in the series may have a thermal mass different from the remaining thermal capacitors in the series.

The advantage of using multiple thermal capacitors is that the thermal capacitors that the gas passes through first may be cooled well below the target temperature range. The gas is brought within the target temperature range via heat exchange with the final thermal capacitor. Properly designed, there is then no risk of delivering the gas at a temperature below the minimum temperature of the target temperature range. By cooling the first thermal capacitors below the minimum temperature of the target temperature range allows the compressor to run longer once turned on.

After the first quantity of gas has been dispensed to the first receiving vessel, a second quantity of gas having a temperature within the first target temperature range may be dispensed to a second receiving vessel.

The method may further comprise withdrawing a second quantity of gas from gas source 7. The second quantity of gas may be an amount sufficient to refill a vehicle fuel tank, for example 3 kg to 10 kg.

The second quantity of gas is cooled via heat exchange with first thermal capacitor 101. The second quantity of gas is subsequently cooled via heat exchange with second thermal capacitor 103.

After being cooled via heat exchange with the second thermal capacitor, the second quantity of gas may be heated or cooled via heat exchange with the third thermal capacitor 107. The third thermal capacitor has a temperature within the first target temperature range. If the temperature of the second quantity of gas is less than the minimum temperature of the first target temperature range after exchanging heat with previous thermal capacitors, the third thermal capacitor 107 will heat the second quantity of gas to a temperature within the first target temperature range. If the temperature of the second quantity of gas is greater than the maximum temperature of the first target temperature range after exchanging heat with previous thermal capacitors, the third thermal capacitor 107 will cool the second quantity of gas to a temperature within the first target temperature range.

After the temperature of the second quantity of gas has been brought within the first target temperature range via heat exchange with the third thermal capacitor, the second quantity of gas, having a dispensing temperature within the first target temperature range, is introduced into a second receiving vessel (not shown) via conduit 137 and a dispensing connector (not shown). The second receiving vessel may be part of a vehicle such as a car, truck, bus, or forklift.

The second quantity of gas may be cooled by additional thermal capacitors 105 between cooling in the second thermal capacitor 103 and heating or cooling in the third thermal capacitor 107.

Setting of the minimum and maximum values for the first target temperature range may be dependent upon a measured ambient temperature. The method may comprise measuring an ambient temperature representative of conditions surrounding any receiving vessels prior to filling. The ambient temperature may be measured by any suitable temperature sensor, shown schematically in the FIGURE as temperature sensor 57. Presumably, the temperature of any residual gas in receiving vessels prior to filling will be at or near ambient temperature. The temperature sensor 57 for determining the ambient temperature should generally not be in direct sunlight. Setting of the minimum and maximum values of the first target temperature range may be dependent upon any measured temperature in the receiving vessel prior to fill, the measured temperature as may be available from a communication fill. This may be suitable to determine if the vehicle, for example on a cold day, just arrived for refueling from a warm garage, thus having a receiving vessel at a temperature higher than ambient temperature.

The reason for adjusting the minimum and maximum values for the first target temperature range is that the degree of cooling necessary to prevent overheating of the receiving vessel may depend on the ambient temperature. On cold days, less cooling of the gas is required. Furthermore, by maintaining the thermal capacitors at higher temperatures on cold days saves on energy required for cooling the thermal capacitors.

It may be desirable to have the option to dispense different batches of gas within different target temperature ranges, for example, depending upon the ambient temperature and/or temperature of the receiving vessel.

A third quantity of gas may be dispensed to a third receiving vessel wherein the third quantity of gas is dispensed at a dispensing temperature within a second target temperature range wherein the second target temperature range is different than the first target temperature range. The second target temperature range may be preset by the device or selected by a user or operator. The second target temperature range has a minimum temperature and a maximum temperature.

For example, the first target temperature range may be −40° C. to −33° C. and the second target temperature range may be −20° C. to +3° C. The user or operator may want the option to choose whether to dispense the gas within the first temperature range or the second temperature range. The first temperature range may be selected, for example, if the ambient temperature is greater than 15° C. and/or the temperature measured in the receiving tank is greater than 15° C., and the second temperature range may be selected if the ambient temperature is less than 15° C.

In case, it is desired to dispense the gas within the second temperature range, the method may further comprise withdrawing a third quantity of gas from gas source 7. The third quantity of gas may be an amount sufficient to refill a vehicle fuel tank, for example 3 kg to 10 kg.

The third quantity of gas is cooled via heat exchange with first thermal capacitor 101. The third quantity of gas is subsequently cooled via heat exchange with second thermal capacitor 103.

After being cooled via heat exchange with the second thermal capacitor, the third quantity of gas may be heated or cooled via heat exchange with a fourth thermal capacitor 207. The fourth thermal capacitor has a temperature within the second target temperature range. If the temperature of the third quantity of gas is less than the minimum temperature of the second target temperature range after exchanging heat with previous thermal capacitors, the fourth thermal capacitor 207 will heat the third quantity of gas to a temperature within the second target temperature range. If the temperature of the third quantity of gas is greater than the maximum temperature of the second target temperature range after exchanging heat with previous thermal capacitors, the fourth thermal capacitor 207 will cool the third quantity of gas to a temperature within the second target temperature range.

After the temperature of the third quantity of gas has been brought within second target temperature range via heat exchange with the fourth thermal capacitor, the third quantity of gas, having a dispensing temperature within the second target temperature range, is introduced into a third receiving vessel (not shown) via conduit 237 and a dispensing connector (not shown). The third receiving vessel may be part of a vehicle such as a car, truck, bus, or forklift.

The third quantity of gas may be cooled by additional thermal capacitors 105 between cooling in the second thermal capacitor 103 and heating or cooling in the fourth thermal capacitor 207.

Thermal capacitors 101, 103, 105 (if present), 107 and 207 (if present) are cooled in order to provide cooling of the gas. The thermal capacitors may be cooled by heat exchange with a refrigerant. The refrigerant may be any suitable refrigerant known in the art, for example, R508A. The refrigerant is cycled in a refrigeration cycle. As shown in the FIGURE, the refrigerant is compressed in compressor 157, cooled in heat exchanger (condenser) 117 and expanded through expansion valves 39, 41, 43 (if present), 45 and 245 (if present). The compressor and heat exchanger may be part of a chiller unit such as a Trenton Refrigeration model T150V6-HT3AB. The refrigerant expanded through valve 39 cools thermal capacitor 101. The refrigerant expanded through valve 41 cools thermal capacitor 103. The refrigerant expanded through valve 43 cools thermal capacitor 105. The refrigerant expanded through valve 45 cools thermal capacitor 107. The refrigerant expanded through valve 245 cools thermal capacitor 207.

The thermal capacitors may be cooled by the refrigerant while the gas is being cooled by the thermal capacitors. The thermal capacitors may be cooled by the refrigerant at a time when no gas is being cooled by the thermal capacitors.

The flow rate of the refrigerant to each of the thermal capacitors may be independently controlled as shown in the FIGURE by valves 121, 123, 125, 127, and 129.

The temperature of each of the thermal capacitors may be individually controlled by controlling the flow rate of refrigerant to each respective thermal capacitor.

Temperature measurement devices 29, 31, 33, 35, and 37 measure the temperature of their respective thermal capacitors. Controller 119 receives signals from the temperature measurement devices and controls the flow rate of refrigerant through valves 121, 123, 125, 127, and 129 in order to maintain the desired temperatures for the thermal capacitors.

In order to prevent heat conduction between each of the thermal capacitors, any connecting pipes, tubes and the like may constructed from materials having low thermal conductivity. For example, stainless steel may be used rather than copper or brass or other materials that are commonly used for refrigeration units.

Since the article "a" means "one or more," a second refrigerant, a second compressor, and a second heat exchanger (condenser) may be used in a second refrigeration cycle. Some of the thermal capacitors may be cooled by a first refrigerant cycled in a first refrigeration cycle and some other thermal capacitors may be cooled by a second refrigerant in a second refrigeration cycle. The first refrigerant and the second refrigerant may be the same or different.

The advantage of using multiple refrigeration cycles is that the dispensing station capacity is increased while allowing each of the individual compressors to remain on for longer periods of time once turned on, thereby increasing the life of each compressor.

In some instances, a receiving vessel in a sequence of receiving vessels to receive the gas may not be capable of receiving cold gas. For this case an optional bypass line 301 is provided to bypass all the thermal capacitors. Consequently, the method may further comprise withdrawing a fourth quantity of gas from the gas source 7, and introducing the fourth quantity of gas from the gas source into a fourth receiving vessel without cooling the fourth quantity of gas between withdrawing the fourth quantity of gas from the gas source and introducing the fourth quantity of gas into the fourth receiving vessel.

EXAMPLE

Comparative Case

A single large aluminum block used to cool down hydrogen from 35° C. to −40° C. at the start of a 5 kg fill, and warming to the point where the hydrogen gas exits the aluminum block at −33° C. at the end of the fill would need to weigh about 780 kgs. The aluminum block would not be able to be used again for cooling the hydrogen gas down to −33° C. until the aluminum block is completely recooled after the fill.

EXAMPLE

Multiple Thermal Capacitors

This example contemplates a system with four thermal capacitors in series for cooling hydrogen gas. The target temperature range for dispensing the hydrogen gas is −37° C. to −40° C. in this example.

Each of the four thermal capacitors are made from aluminum and have a mass of 200 kg corresponding to a thermal mass of about 182 kJ/K. For this example, the thermal capacitors are assumed to be perfectly insulated.

Initially the first thermal capacitor, the second thermal capacitor, and the third thermal capacitor are at −50° C. and the final thermal capacitor is −37° C.

A flow rate of hydrogen totaling 5 kg is passed through each of the thermal capacitors. The initial gas temperature from the gas source is 35° C. The initial portion of hydrogen that exits from the first thermal capacitor exits at a temperature of about −43° C. and the last portion exits at a temperature of about −13° C. The first thermal capacitor warms from −50° C. to −17° C. as the first quantity of hydrogen is passed through the first thermal capacitor.

Hydrogen entering the second thermal capacitor will exit at temperatures from −49° C. to −32° C. as the second thermal capacitor warms from −50° C. to −46° C. Hydrogen entering the third thermal capacitor will exit at temperatures from −45° C. to −39° C. as the third thermal capacitor warms from −45° C. to −44° C. Hydrogen entering the final thermal capacitor will exit at a constant −37° C. as the final thermal capacitor cools from −37° C. to −38° C.

When it comes time to fill a second receiving vessel, if the refrigeration plant is running, and has sufficient time between fills, all of the thermal capacitors will be cooled to their normal conditions (e.g. −50° C. for the first, second, and third thermal capacitor, and −38° C. for the final thermal capacitor).

If the refrigeration unit provides no cooling to the thermal capacitors after filling the first receiving vessel and before filling the second receiving vessel, the example assumes that the thermal capacitors maintain their temperature at the end of filling the first receiving vessel (−17° C. for the first thermal capacitor, −46° C. for the second thermal capacitor, −44° C. for the third thermal capacitor, and −38° C. for the final thermal capacitor).

A second batch of hydrogen totaling 5 kg is passed through each of the thermal capacitors. The initial gas temperature of the second batch of gas from the gas source is 35° C. The initial portion of hydrogen that exits from the first thermal capacitor exits at a temperature of about −13° C. and the last portion exits at a temperature of about +6° C. The first thermal capacitor warms from −17° C. to +2° C. as the second quantity of hydrogen is passed through the first thermal capacitor.

Hydrogen entering the second thermal capacitor will exit at temperatures from −44° C. to −22° C. as the second thermal capacitor warms from −46° C. to −39° C. Hydrogen entering the third thermal capacitor will exit at temperatures from −44° C. to −34° C. as the third thermal capacitor warms from −44° C. to −43° C. Hydrogen entering the final thermal capacitor will exit at a constant −37° C. as the final thermal capacitor stays at a constant −38° C.

In this example, the system will continue to keep the hydrogen within the target temperature range for two more fills without needing to turn on the refrigeration unit. Once the relatively small refrigeration unit (10 kW for example) turns on, it can run for up to 15 minutes per vehicle filled, an hour of continuous running if four vehicles are filled, allowing the refrigeration unit to be sized to balance the average thermal demand, not just the peak refrigeration demand. The exiting gas temperature stays at a constant temperature, and is not affected by changes in flow rates.

We claim:

1. A method for dispensing a gas, the method comprising:
   withdrawing a first quantity of the gas from a gas source, the first quantity of gas having an initial temperature;
   cooling the first quantity of gas via heat exchange with a first thermal capacitor wherein the first thermal capacitor has a temperature lower than the minimum temperature of a first target temperature range when the first quantity of gas is initially cooled by the first thermal capacitor;
   cooling the first quantity of gas via heat exchange with a second thermal capacitor wherein the second thermal capacitor has a temperature lower than the minimum temperature of the first target temperature range when the first quantity of gas is initially cooled by the second thermal capacitor, wherein the first quantity of gas is cooled via heat exchange with the second thermal capacitor after being cooled via heat exchange with the first thermal capacitor;
   heating the first quantity of gas via heat exchange with a third thermal capacitor wherein the third thermal capacitor has a temperature within the first target temperature range, wherein the first quantity of gas exchanges heat with the third thermal capacitor after being cooled via heat exchange with the second thermal capacitor;
   introducing the first quantity of gas from the third thermal capacitor into a first receiving vessel, the first quantity of gas thereby having a dispensing temperature within the first target temperature range, wherein the dispensing temperature is less than the initial temperature; and cooling the first thermal capacitor, the second thermal capacitor, and the third thermal capacitor via heat exchange with a refrigerant, wherein the refrigerant is cycled in a refrigeration cycle, wherein the first thermal capacitor, the second thermal capacitor, and the third thermal capacitor are cooled by the refrigerant at a time when no gas is being cooled by the first thermal capacitor, the second thermal capacitor, and the third thermal capacitor.

2. The method of claim 1 further comprising:
withdrawing a second quantity of the gas from the gas source;
cooling the second quantity of gas via heat exchange with the first thermal capacitor;
cooling the second quantity of gas via heat exchange with the second thermal capacitor, wherein the second quantity of gas is cooled via heat exchange with the second thermal capacitor after being cooled via heat exchange with the first thermal capacitor;
heating or cooling the second quantity of gas via heat exchange with the third thermal capacitor wherein the third thermal capacitor has a temperature within the first target temperature range, wherein the second quantity of gas exchanges heat with the third thermal capacitor after being cooled via heat exchange with the second thermal capacitor; and
introducing the second quantity of gas from the third thermal capacitor into a second receiving vessel, the second quantity of gas thereby having a dispensing temperature within the first target temperature range.

3. The method of claim 1 wherein a flow rate of the refrigerant to each of the first thermal capacitor, the second thermal capacitor, and the third thermal capacitor is independently controlled.

4. The method of claim 1 further comprising:
cooling the first thermal capacitor and the second thermal capacitor via heat exchange with a refrigerant, wherein the refrigerant is cycled in a refrigeration cycle; and
cooling the third thermal capacitor via heat exchange with a second refrigerant, wherein the second refrigerant is cycled in a second refrigeration cycle.

5. The method of claim 1 further comprising:
withdrawing a third quantity of the gas from the gas source;
cooling the third quantity of gas via heat exchange with the first thermal capacitor;
cooling the third quantity of gas via heat exchange with the second thermal capacitor, wherein the third quantity of gas is cooled via heat exchange with the second thermal capacitor after being cooled via heat exchange with the first thermal capacitor;
heating or cooling the third quantity of gas via heat exchange with a fourth thermal capacitor wherein the fourth thermal capacitor has a temperature within a second target temperature range, wherein the second target temperature range is different than the first target temperature range, and wherein the third quantity of gas exchanges heat with the fourth thermal capacitor after being cooled via heat exchange with the second thermal capacitor; and
introducing the third quantity of gas from the fourth thermal capacitor into a third receiving vessel, the third quantity of gas thereby having a dispensing temperature within the second target temperature range.

6. The method of claim 5 further comprising:
measuring an ambient temperature representative of conditions surrounding a fourth receiving vessel;
withdrawing a fourth quantity of the gas from the gas source;
cooling the fourth quantity of gas via heat exchange with the first thermal capacitor;
cooling the fourth quantity of gas via heat exchange with the second thermal capacitor, wherein the fourth quantity of gas is cooled via heat exchange with the second thermal capacitor after being cooled via heat exchange with the first thermal capacitor;
heating or cooling the fourth quantity of gas via heat exchange with one of the third thermal capacitor or the fourth thermal capacitor, the third thermal capacitor having its temperature within the first temperature range, the fourth thermal capacitor having its temperature within the second temperature range, the selection of heating or cooling the fourth quantity of gas via heat exchange with the third thermal capacitor or the fourth thermal capacitor dependent upon the measured ambient temperature surrounding the fourth receiving vessel; and
introducing the fourth quantity of gas from the third thermal capacitor or from the fourth thermal capacitor into the fourth receiving vessel, the fourth quantity of gas thereby having a dispensing temperature within the first target temperature range when the fourth quantity of gas exchanges heat with the third thermal capacitor or having a dispensing temperature within the second target temperature range when the fourth quantity of gas exchanges heat with the fourth thermal capacitor.

7. The method of claim 1 wherein at least one of the first thermal capacitor, the second thermal capacitor, and the third thermal capacitor comprises a metal.

8. The method of claim 7 wherein the metal is aluminum.

9. The method of claim 1 wherein at least one of the first thermal capacitor, the second thermal capacitor, and the third thermal capacitor comprises a liquid.

10. The method of claim 9 wherein the liquid is a liquid hydrocarbon.

11. The method of claim 10 wherein the liquid hydrocarbon is a C10 to C13 iso-alkane.

12. The method of claim 1 further comprising:
withdrawing a fifth quantity of the gas from the gas source; and
introducing the fifth quantity of gas from the gas source into a fifth receiving vessel without cooling the fifth quantity of gas between withdrawing the fifth quantity of gas from the gas source and introducing the fifth quantity of gas into the fifth receiving vessel.

13. The method of claim 1 further comprising:
measuring an ambient temperature representative of conditions surrounding the first receiving vessel prior to withdrawing the first quantity of gas from the gas source; and
setting the first target temperature range dependent upon the measured ambient temperature prior to withdrawing the first quantity of gas from the gas source.

14. The method of claim 1 where the refrigerant is compressed in a compressor, cooled in a heat exchanger, and expanded through an expansion valve in the refrigeration cycle.

* * * * *